(12) United States Patent
Garcia

(10) Patent No.: US 6,585,182 B1
(45) Date of Patent: Jul. 1, 2003

(54) RATCHETED HAND HELD FISHING REEL

(76) Inventor: Israel Garcia, 6444 Collins Ave., Apt. 302, Miami Beach, FL (US) 33141

( * ) Notice: Subject to any disclaimer, the term of this patent is extended or adjusted under 35 U.S.C. 154(b) by 76 days.

(21) Appl. No.: 09/967,598

(22) Filed: Sep. 28, 2001

(51) Int. Cl.⁷ .............................................. A01K 89/00
(52) U.S. Cl. ................. 242/322; 242/298; 242/370; 242/405.3; 242/588.2; 43/20; D22/140
(58) Field of Search ................. 242/370, 223, 242/298, 322, 588, 588.2, 400.1, 405.1, 405.2, 405.3; D22/140, 141; 43/20

(56) References Cited

U.S. PATENT DOCUMENTS

| | | | | |
|---|---|---|---|---|
| 3,174,703 A | * | 3/1965 | Falkum | 242/405.2 |
| 3,289,968 A | * | 12/1966 | Wilson | 242/396.8 |
| 3,388,876 A | * | 6/1968 | Wilson | 242/470 |
| 3,557,483 A | | 1/1971 | Wilson | |
| 3,838,830 A | * | 10/1974 | Pettit | 242/395 |
| 3,888,011 A | * | 6/1975 | Hunt, Jr. | 33/720 |
| 4,688,740 A | * | 8/1987 | Weeks et al. | 242/396.7 |
| 5,186,411 A | * | 2/1993 | Fanning et al. | 242/405.3 |
| 6,152,395 A | * | 11/2000 | Corriveau et al. | 242/388.6 |

FOREIGN PATENT DOCUMENTS

WO   WO 89/01285   *   2/1989

* cited by examiner

Primary Examiner—Emmanuel Marcelo
(74) Attorney, Agent, or Firm—J. Sanchelima; A. Bordas

(57) ABSTRACT

A hand held fishing reel with an outer reel assembly with a wound line that is releasable when the reel's plane is turned substantially perpendicular to the line and it is locked when its plane is aligned with the line. A ratchet mechanism permits a user to take in the line, when the plane of the reel is aligned with the line. An internal cylinder is rotatably mounted in the central space with an ergonometric grip and ratchet for cooperatively receiving a mating body to releasably holding the reel in place. The hand held fishing reel is releasably mounted to a fixed structure to free a user's hand.

2 Claims, 2 Drawing Sheets

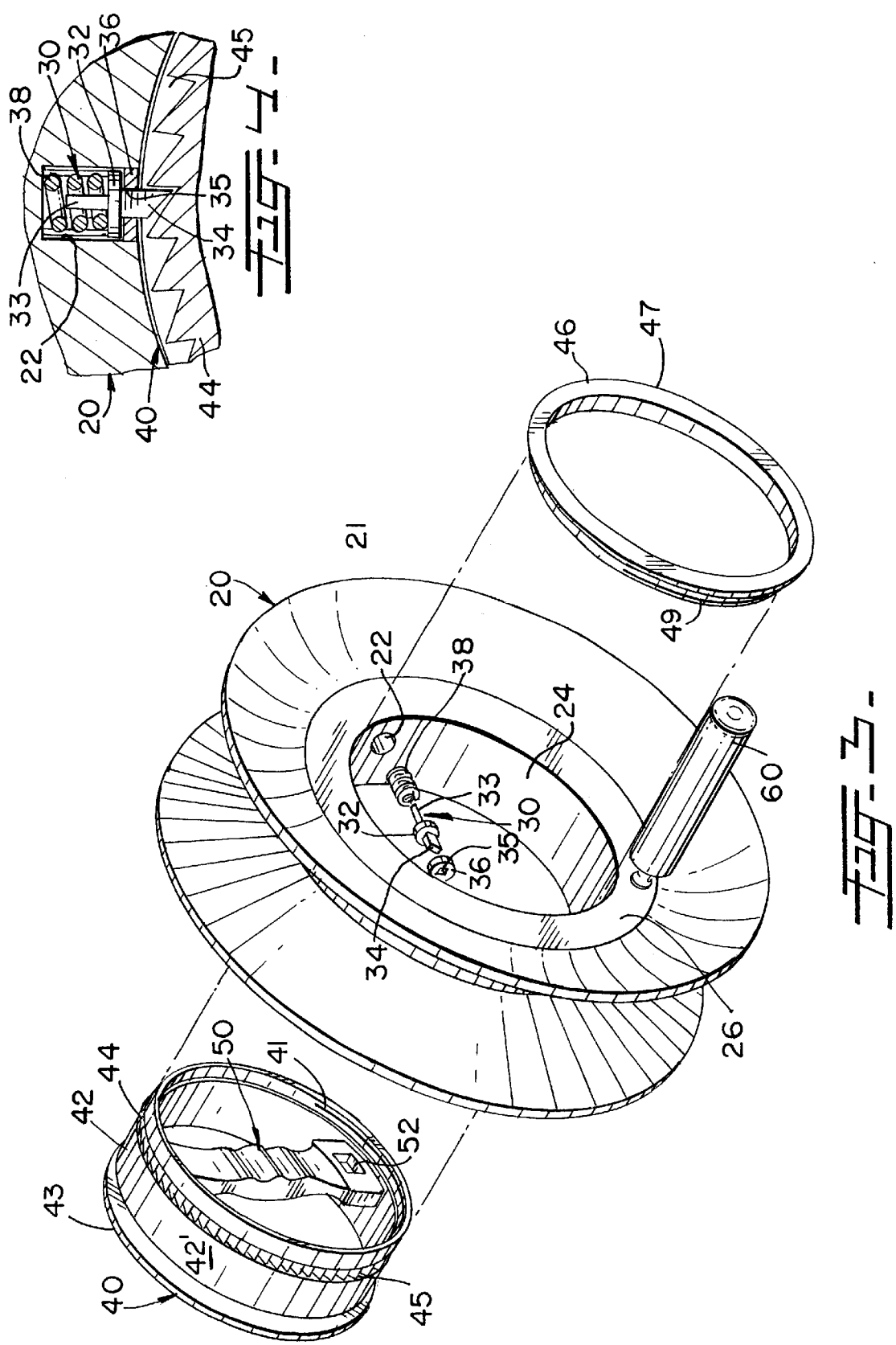

RATCHETED HAND HELD FISHING REEL

BACKGROUND OF THE INVENTION

1. Field of the Invention

The present invention relates to a fishing apparatus, and more particularly, to a ratcheted hand held fishing reel.

2. Description of the Related Art

Many designs for hand held fishing reels have been designed in the past. None of them, however, include a ratcheted mechanism that permits a user to control the release of the line from the reel by a ratcheted mechanism and a central handler without the use of any additional fixture.

Applicant believes that the closest reference corresponds to U.S. Pat. No. 3,557,483 issued to H. A. Wilson on 1971 for a fishing rod with reel handle section. Wilson's patent disclosed a fishing reel that includes a handle in the center of the reel and a crank to rotate the fishing reel and a rod. The Wilson patent discloses a fishing rod improvement whereby the weight of the reel assembly coincides with the handle. Also, the patented invention attempts to prevent rotation of the rod, as it frequently happens when the reel assembly is spaced apart from the handle. The patented fishing rod does not disclose a ratchet mechanism. The present invention has a crank handle assembly mounted at the innermost outer portion of the spool of fishing reel assembly so that it does not interfere with line casting. Wilson's patent would not work unless its crank 17 is repositioned, a feature that was not considered. The present invention has the convenience of a hand held reel assembly with a ratcheted mechanism only used in rod assemblies.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a hand held fishing reel that allows a user to cast a line by holding the fishing reel assembly in one position and to take the line in by rotation of the reel assembly to another position.

It is another object of this invention to provide a hand held fishing reel that can be readily mounted and unmounted to and from a rigidly mounted holding assembly.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an exploded view of the present invention.

FIG. 4 is a representation of a partial enlarged cross-sectional view of the ratchet mechanism taken along line 4-4 in FIG. 1.

DETAILED DESCRIPTION OF THE PREFERRED EMBODIMENT

Figure 1:
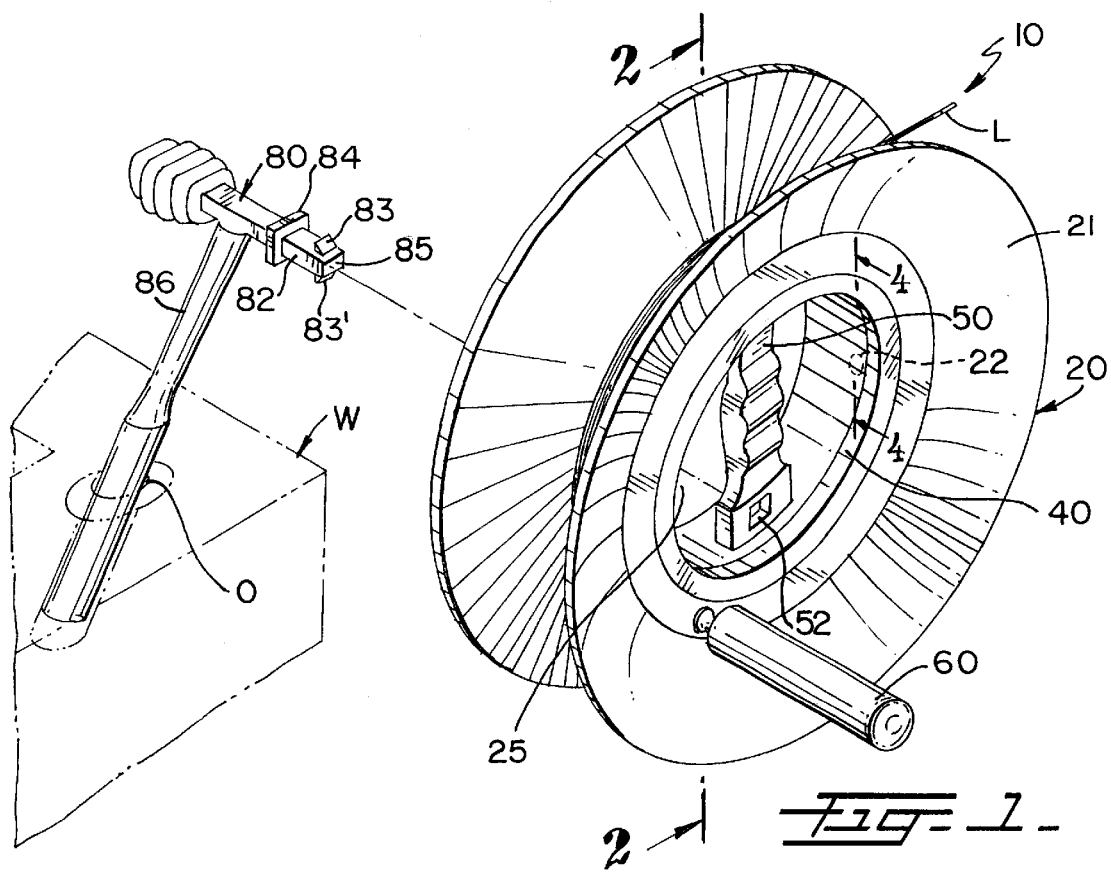
FIG. 1 represents an isometric view of the ratcheted hand held reel object of the present application including the optional holding assembly mounted to a fixed point.

Referring now to the drawings, where the present invention is generally referred to with numeral 10, it can be observed that it basically includes fishing reel assembly 20, ratchet mechanism 30, cylinder assembly 40, handle assembly 50, crank handle assembly 60, and fixed holding assembly 80.

As shown in FIG. 1, fishing reel 10 is a hand held fishing apparatus that includes fishing reel assembly 20 with spool 21 where a fishing line is wound. Central space 25 defined by internal wall 24 houses cylinder assembly 40. Cylinder assembly 40 is internally and rotatably mounted within central space 25 and its two ends substantially co-extend with wall 24. One end of cylinder assembly 40 terminates with peripheral flange 43 that abuts outer concave wall 27 of spool 21 preventing cylinder assembly 40 from moving in one direction (to the right of FIG. 2). Hollow cap assembly 46 includes peripheral flange 47 that comes in contact with outer concave wall 27' when assembly 46 is mounted to the other end of cylindrical assembly 40. In the preferred embodiment, mating threads 41 and 49 are shown to mount assembly 46. Any other equivalent means can be used to secure cylinder assembly 40 rotatably within space 25. As best seen in FIGS. 3 and 4, cylinder assembly 40 includes a teethed ring or band 44 embedded in peripheral groove 45.

Figure 2:
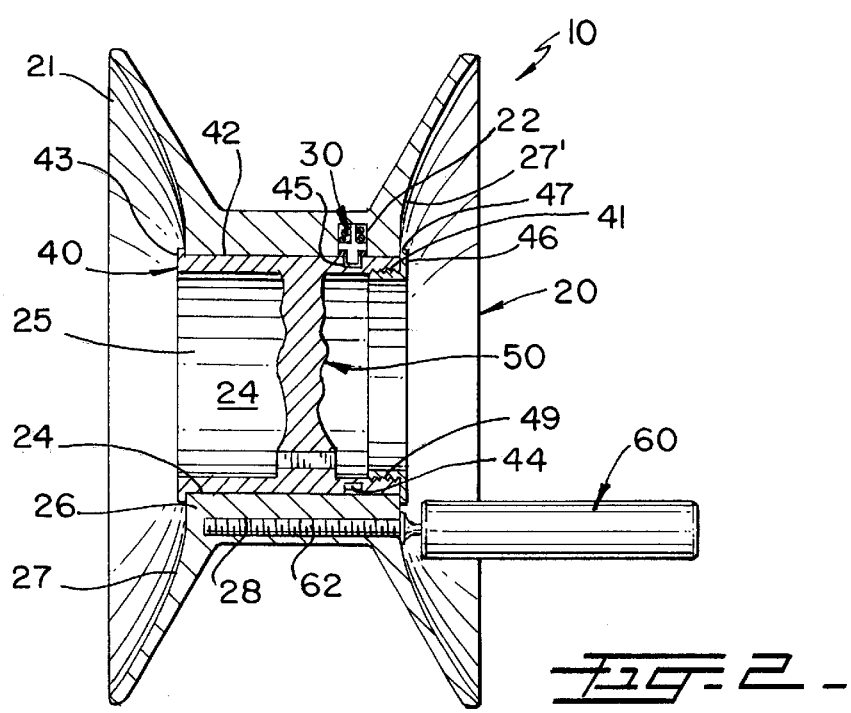
FIG. 2 shows cross-sectional view of the ratcheted reel taken along line 2—2 from FIG. 1.

Fishing reel 10 also includes crank handler assembly 60 mounted to core 26 of reel assembly 20 and adjacent to central space 25. Crank handler assembly 60 has threaded shank 62 mounted to threaded opening 28, as best seen in FIG. 2.

As seen in FIG. 3, internal wall 24 reel assembly 20 includes radial opening 22 where ratchet mechanism 30 is housed. Shank 33 is journaled with spring 38 at one end that is housed within opening 22. The other end of shank 33 terminates with base 32 that coacts with spring 38 when compressed. Pawl 34 protrudes through central through opening 35 of plug member 36. In this manner, pawl 34 can be pushed to compress spring 38 and the former is flush with internal wall 24. The end of pawl 34 coacts with teethed ring 44 which is flush with outer surface 42' of cylinder member 42.

Fixed holding assembly 80 includes elongated shank 86 to be inserted in opening O, typically found in watercrafts W (partially shown in phantom). Shank 86 is inserted in opening O to provide a fixed anchorage for assembly 80. Holding assembly 80 also includes locking mechanism 82. In one of the preferred embodiments, it includes stopper member 84 and spring loaded nails 83 and 83' for releasably permitting non circular pin 85 to be housed within corresponding noncircular through opening 52. In this matter, fishing reel 10 is kept at a fixed position with respect to another structure, such as watercraft W.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hand held fishing reel apparatus, comprising:

A) reel means for keeping a line wound thereon, said reel means including an internal wall defining a central space;

B) a cylinder assembly rotatably mounted within said central space including an external surface having a teethed ring and a cylindrical member with first and second ends, said first end having a first peripheral flange coacting with said reel means to prevent said cylinder assembly from moving within said central space in one direction and said cylinder assembly further including a cylindrical cap member removably mounted to said second end, said cylindrical cap member including a second peripheral flange member coacting with said reel means and preventing said cylinder assembly from moving in the other direction thereby keeping said cylinder assembly within said central space;

C) ratchet means for allowing said fish reel means to rotate in only one direction with respect to said cylinder assembly, said ratchet means including a spring biased pawl member mounted within said internal wall and cooperatively protruding outwardly to engage with said teethed ring to cammingly move inwardly when said cylinder assembly rotates in one direction while locking to said teethed ring when said cylinder assembly attempts to rotate in other direction;

D) a handle means rigidly mounted within said cylinder assembly; and

E) crank handle means for rotating said reel means, cooperatively mounted on said reel means adjacent to said central space.

2. The apparatus set forth in claim 1 further including a holding assembly mounted to a fixed structure and including an elongated member having a distal end and further including locking means for releasably mounting said handle means.

* * * * *